United States Patent
Boasson et al.

(10) Patent No.: US 6,898,207 B2
(45) Date of Patent: May 24, 2005

(54) TECHNIQUES FOR COMMUNICATING INFORMATION USING HERMITE-GAUSSIAN BASIS FUNCTIONS

(75) Inventors: Erik Boasson, Borculo (NL); Maarten Boasson, Borculo (NL); Pentti Kouri, New York, NY (US)

(73) Assignee: Bandwidth Technology Corp., New York, NY (US)

( * ) Notice: Subject to any disclaimer, the term of this patent is extended or adjusted under 35 U.S.C. 154(b) by 99 days.

(21) Appl. No.: 10/326,318

(22) Filed: Dec. 20, 2002

(65) Prior Publication Data

US 2004/0047372 A1 Mar. 11, 2004

Related U.S. Application Data

(63) Continuation-in-part of application No. 10/215,806, filed on Aug. 8, 2002, which is a continuation-in-part of application No. 10/022,333, filed on Dec. 20, 2001, which is a continuation of application No. 09/120,448, filed on Jul. 22, 1998, now Pat. No. 6,404,779.
(60) Provisional application No. 60/061,335, filed on Oct. 7, 1997.

(51) Int. Cl.$^7$ ............................................... H04J 3/02
(52) U.S. Cl. ........................................ 370/463; 370/537
(58) Field of Search ................................ 370/203, 211, 370/433, 437, 463, 436, 535, 536, 537, 538, 540, 542, 543, 544, 545, 468; 375/240, 346, 347, 348

(56) References Cited

U.S. PATENT DOCUMENTS

| | | | | | |
|---|---|---|---|---|---|
| 4,783,804 A | * | 11/1988 | Juang et al. | ............... | 704/245 |
| 5,715,367 A | * | 2/1998 | Gillick et al. | ............... | 704/254 |
| 6,317,161 B1 | * | 11/2001 | Renner et al. | ............... | 348/536 |

* cited by examiner

Primary Examiner—Kwang Bin Yao
(74) Attorney, Agent, or Firm—Steven R. Bartholomew; David D. Lowry

(57) ABSTRACT

Systems and methods for efficiently conveying one or more communication channels over a transmission medium. Communication is effected by transforming an incoming digital bit stream into a Hermite-Gaussian information stream that includes a plurality of Hermite-Gaussian packets. This transformation is accomplished through the use of a plurality of Hermite-Gaussian basis functions. The Hermite-Gaussian information stream is then transmitted over the transmission medium. More particularly, digital bit streams carried on one or more incoming channels may be in the form of binary "on" and "off" bits. These digital bits are converted into a plurality of Hermite-Gaussian waveform components which together comprise a Hermite-Gaussian packet. The conversion process maps each of respective incoming digital bits to a corresponding one of a group of Hermite-Gaussian functions. Optionally, this mapping process could be implemented sequentially, or in parallel form, such that a first bit is mapped to a first Hermite-Gaussian function, a second bit is mapped to a second Hermite-Gaussian function, and so on, until the Nth Hermite-Gaussian function is reached, whereupon the process cycles back to the first Hermite-Gaussian function. In any case, the presence of a "1", "on", or "high" bit enables the corresponding Hermite-Gaussian function, whereas the presence of a "0", "off", or "low" bit disables the corresponding Hermite-Gaussian function. When enabled, each respective Hermite-Gaussian function specifies the transmission of a corresponding Hermite-Gaussian waveform component. Each waveform component is substantially confined within a range of values in both the frequency and time domains.

12 Claims, 8 Drawing Sheets

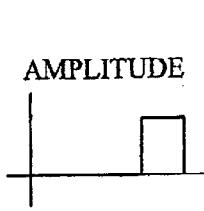 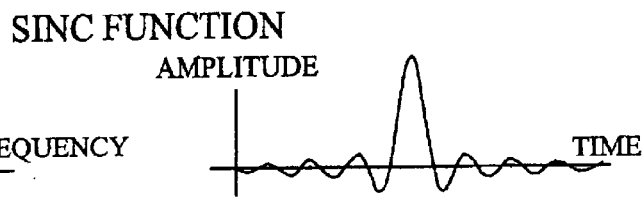
FIG. 7A  FIG. 7B
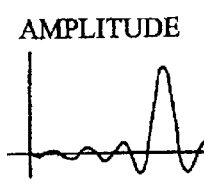 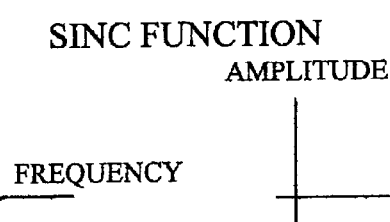
FIG. 7C  FIG. 7D
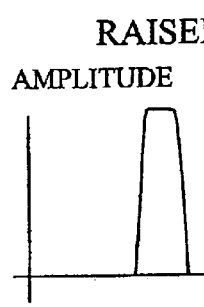 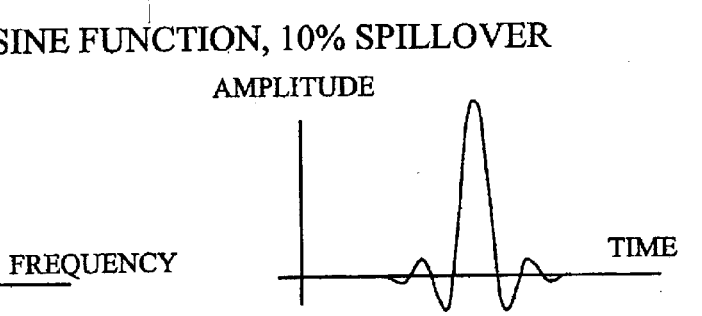
FIG. 8A  FIG. 8B
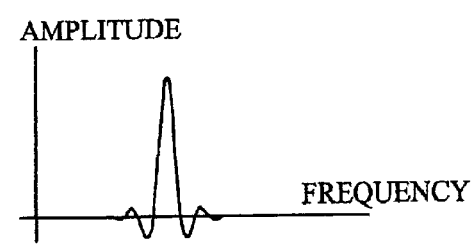 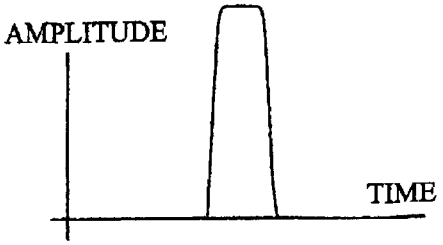
FIG. 8C  FIG. 8D

TECHNIQUES FOR COMMUNICATING INFORMATION USING HERMITE-GAUSSIAN BASIS FUNCTIONS

RELATED CASES

This application is a Continuation-In-Part of patent application Ser. No. 10/215,806 filed on Aug. 8, 2002, which is a Continuation-In-Part of patent application Ser. No. 10/022,333, filed on Dec. 20, 2001, which is a Continuation of patent application Ser. No. 09/120,448, filed on Jul. 22, 1998, now U.S. Pat. No. 6,404,779, the disclosures of which are incorporated by reference herein patent application Ser. No. 09/120,448 claims the benefit of Provisional Patent Application Ser. No. 60/061,335, filed on Oct. 7, 1997, the disclosure of which is incorporated by reference herein.

BACKGROUND OF THE INVENTION

1. Field of the Invention

This invention relates to communications techniques, and more specifically, to systems and methods for increasing the effective data throughput of a transmission medium through the use of Hermite-Gaussian basis functions.

2. Description of Background Art

Years ago, the Internet was the domain of educators, scientists, military personnel, and technophiles. Web pages were utilitarian and simplistic. Many offered text-based information, or provided the most rudimentary of graphical interfaces. Expensive, elaborate equipment was required to access the Internet, but this hardware was purchased by large corporations or at governmental expense. By and large, the general consuming public did not have the means, inclination, or desire to access the Internet. But this has all changed.

More recently, the Internet has enjoyed an ever-expanding audience. In late 2002, it is something of a rarity to find a residential premises in the United States that does not have Internet access. A modem-equipped personal computer is almost as ubiquitous as a refrigerator, microwave oven, or a VCR (video cassette recorder). In the case of refrigerators, widespread usage does not pose an insurmountable technical hurdle, as the public utility company must merely increase its power generation capacity to keep up with the increased demand. However, in the case of the Internet, increased usage poses problems that are not so readily solved. Hundreds of thousands of individuals attempt to access the Internet every day. But they are not satisfied with text-based web pages or simplistic graphical interfaces—they would like to view real-time moving video images, listen to full-bandwidth audio, and download large files which may be several Megabytes in length.

Given the types of information that Internet users are presently accessing, heavy demands are placed on the bandwidth capacity of the user's Internet connection. Full-motion video, 20–20 kHz two-channel audio, large file downloads, and graphics-intensive websites require a bandwidth on the order of 200 Kilobytes to 3 Megabytes per second, give or take. On the other hand, most residential users access the Internet over a conventional subscriber loop to the local telephone company central office. In many cases, subscribers live more than two miles from the nearest central office, and cannot avail themselves of DSL service. Using state-of-the-art modem technology, this conventional (i.e., non-DSL) subscriber loop provides a bandwidth no greater than 56 Kilobytes per second and, in many cases, a lot less.

Expanded-bandwidth solutions exist on paper, but practical implementations of these solutions have not been realized. When a residential customer orders a service such as ISDN (Integrated Services Data Network) or DSL (Digital Subscriber Loop) from the local telephone company, it is difficult to obtain adequate performance. The services are theoretically available, but a residential customer requesting an ISDN line or DSL service often unwittingly becomes part of a "beta test", due to lack of strong demand on the part of residential customers, and a consequent lack of practical experience on the part of the telephone company. Even if the various installation obstacles are eventually overcome, the monthly fees associated with an ISDN or DSL connection are cost-prohibitive for many customers.

Cable modems represent another alternative to conventional 56K modems for customers wishing to access the Internet. Nonetheless, telephone service is regarded as a basic necessity, present in virtually every household throughout the United States, whereas cable service is a non-essential or luxury item in locations with acceptable over-the-air reception. Moreover, since the FCC (Federal Communications Commission) has mandated conversion of analog over-the-air broadcasts to digital high-definition (HDTV) transmissions by 2006, many consumers will have access to acceptable over-the-air signals for the first time ever. With the recent proliferation of monthly subscription fees to cover everything from lawn maintenance to cellular telephone access, many customers would welcome the opportunity to avoid a monthly bill from the cable company.

An additional shortcoming of cable modems is that cable jacks are only provided in one or two rooms of a typical residential premises. If the customer desires Internet access from various locations throughout the home, this necessitates laborious cable-pulling through walls, floors, and attics. By contrast, telephone jacks are typically provided in a greater number of locations including bedrooms, kitchens, family rooms, basements, the garage, and even bathrooms.

What is needed is an improved method for accessing the Internet over a widely-available communications link. Such a method should not require the installation of additional wiring to a residential premises and, ideally, should operate over presently-existing communication paths. One possible candidate for such a communications path is the existing public switched telephone network (PSTN).

PSTN: The first PSTN communication system utilized twisted pairs of copper wire such that a single pair would carry one message at a time. Communications companies realized that, in order to enhance message-carrying capacity, they would need to devise techniques for transmitting several messages simultaneously over a single wire pair, because the cost of installing additional wires to accommodate increased demand was high. Companies that could reduce costs by putting more and more information over a single wire pair would have a competitive advantage.

Discoveries in transmission techniques enabled more than one message to be transmitted per wire pair, paving the way for the telegraph and telephone industry to become viable commercial enterprises. The challenge of maximizing effective bandwidth and increasing line capacity was present from the very beginning of telecommunications technology, and is still with us today.

Telecommunications networks provide the primary mechanism for conveying voice and data traffic between a source and a destination. But existing networks cannot handle the ever-increasing demand for capacity. Population increases, lower telephone rates, and increased data traffic over the Internet, all underscore the need to increase network capacity. But, as more and more bandwidth becomes available, higher bandwidth applications are quickly developed, such as high-resolution web pages and video-on-demand, which once again heightens the demand for increased bandwidth.

Any of several approaches could be employed to meet the increased demand for bandwidth. Additional transmission lines may be installed, additional satellites can be launched, and the radio spectrum can be more fully utilized. But all of these solutions are expensive and limited in scope. Satellites are launched into the Clarke Belt when it is desired to provide 24-hour service to a given geographical region. The Clarke Belt is a special location where satellites, when viewed from the Earth's surface, remain substantially stationary, permitting the use of conventional fix-mounted dish antennas. But, unfortunately, the Clarke Belt only has room for a limited number of satellites that can be placed in geostationary orbit. Wireless systems operate over the public radio spectrum, which, by its very nature, is a limited resource. Bandwidth utilization and compression methods may be employed to expand the capacity of wireless systems, but these methods are not sufficiently efficient to meet the demand in heavily-populated areas. To remain competitive, network service providers must endeavor to preserve the functionality of existing networks, yet still be able to accommodate the increasing bandwidth demand to handle voice, data, and video transmission.

In conventional analog transmission, voice energy acts to vibrate a diaphragm or crystal in a microphone, thereby converting mechanical vibrations into an electrical signal. The amplitude of this electrical signal varies in a manner analagous to the acoustical vibrations of the speaker's voice. This electrical signal can be amplified and transmitted over a wire pair to a receiver at a remote location. At the receiver, the electrical signal is used to energize an electromagnet, actuating a diaphragm in proximity to the magnet, whereby the diaphragm vibrates to reproduce the original voice. Digital transmission adds several steps to this transformation, for the voice is converted to an electrical current pattern whose varying amplitude is measured thousands of times per second. These measurements are encoded as voltage or amplitude levels, representing binary numbers consisting of "0" and "1"s.

Unlike analog transmission which conveys audio information as a continuous waveform, in digital transmission, binary numbers are transmitted in representational encoding schemes. Binary digits or bits may be transmitted singly, as discrete, on-off or zero/non-zero current pulses, or in groups as simultaneous pulses at different frequencies. At the receiving end, the bit stream is detected and used to modulate an analog current which drives a speaker. This method is "digital" because it entails conversion of an analog signal to numbers, and the transmission of digits in symbolic form.

Compression: Several existing methods provide for the transmission of information while reducing the overall bandwidth requirements. The most widely employed compression method uses mathematical algorithms and dictionary tables to manipulate and "point" digital signals in such a way that each transmission channel uses less bandwidth to carry recognizable information. Compression is achieved by building a predictive model of the waveform, removing unnecessary elements, and reconstructing the waveform from the remaining elements.

When converting an analog signal into digital form, accurate conversion requires at least twice as many measurements (samples per second), as the highest frequency in the signal. This sampling rate is oftentimes referred to as the Nyquist Criterion. The human voice generates sound frequencies in an approximate range of 20 to 4,000 Hz. Hence, a digital voice circuit, accepting an input in the range of 0–4,000 Hz, must sample this signal 8,000 times per second. In practice, the PSTN represents each sample using 8 bits of data. A single voice circuit, referred to as DS0, "digital signal level zero", carries 64,000 (8,000×8) bits of data.

Compression methods are based upon reducing the number of bits required to convey a human voice or other data transmission. Currently-utilized compression algorithms can produce acceptable voice quality using less than 64 kbs by eliminating frequencies not necessary for voice intelligibility, particularly those below 300 Hz and those above 3,300 Hz, and possibly by emphasizing the frequencies in the 1,000 Hz range that carry most of the voice energy. Methods that drop an excessive amount of input signal tend to frustrate high-speed tonal data transmission schemes employed by modems and faxes. Currently-employed compression algorithms and equipment are able to transmit acceptable voice quality with a compression ratio of 8:1, using 8,000 bps per channel.

Using these compression methods, one channel can convey eight voice conversations over a line that originally was able to carry only one voice conversation. Higher compression methods which transmit voice over a circuit using less than 8,000 bps, suffer from increasing degradation of voice quality and "loss," whereby at the receiving end of the line the voice in its original form is not clearly heard. Although new methods and algorithms may be employed to allow for clear voice transmission using less than 8,000 bps, there are appreciable limitations to these methods. All compression methods using algorithms suffer from greater and greater "loss" as compression ratios increase. Fax and video transmissions are more sensitive to bandwidth degradations and, hence, are more limited in their acceptable compression ratios.

While the main advantage of digital compression is increased network efficiency, in some situations, compression can degrade efficiency. For example, if the compression scheme is so complicated that it demands a significant amount of computer processing time to compress and decompress data, efficiency will suffer.

Multiplexing: One of the most widely-utilized forms of telecommunications service is known as the "T-1" protocol. T-1 uses a form of multiplexing in which 24 voice and/or data channels, each with 64,000 bps, can simultaneously exist on a pair of twisted copper wires. The total bandwidth capacity of T-1 is 1.544 Mbps. Compression methods are used in conjunction with T-1 and other transmission protocols to maximize bandwidth. Common compression systems using a ratio of 8:1, can carry 192 simultaneous voice or data channels (24×8) over a T-1 line.

Network service providers employ methods for increasing bandwidth through the utilization of compression and multiplexing, the most common multiplexing scheme in the United States being the T-1 protocol. Conversations or digital information carried on each T-1 line or channel is rendered unique, and transmitted with other channels over a common medium by multiplexing.

FDM (Frequency Division Multiplexing) has been used by phone companies to render each of a plurality of voice channels unique, when these channels are to be carried over a single transmission medium, such as a wire pair. Pursuant to one implementation of FDM, each of 24 voice and/or data channels are rendered distinct by having each channel assigned to a frequency band. For example, line 1 would use the frequency band of 0 Hz–4,000 Hz, line 2 would use the 4,000 Hz–8,000 Hz band, and so on. This method is best suited for analog signals which are subject to degradation and noise interference, and is not widely used at present. More common techniques are Time Division Multiplexing (TDM) and Statistical Multiplexing (STM), often called "Packet switching."

Pursuant to TDM, each of the 24 channels (or lines) are rendered distinct by having each channel assigned to a particular, non-overlapping time slot. Frames of 24 time slots are transmitted, in which Channel 1 is allocated the first time slot in the frame, Channel 2 is allocated the second time slot, and so on. STDM works in a similar manner to TDM, assigning channels on the basis of time division. But STDM takes advantage of statistical fluctuations, and instead of automatically assigning each channel to a time slot, STDM assigns only active channels to time slots. Hence, instead of transmitting channels in sequential order (1, 2, 3, 4, 5, 6) as in TDM, STDM only assigns time slots to channels that are being used, e.g., 1, 3, 4, 5, 1, 6 etc. This method creates higher bandwidth utilization than TDM.

OBJECTS AND SUMMARY OF THE INVENTION

In view of the foregoing deficiencies, a primary object of the invention is to provide techniques for increasing the effective data throughput of a communications link which may include any of a wired transmission medium, a wireless transmission link, a satellite link, a fiber optic communication network, and various combinations thereof.

More particularly, an object of this invention is to provide systems and methods in which the effective bandwidth capacity of a transmission medium is enhanced by encoding an incoming signal using Hermite-Gaussian functions.

A further object of the invention is to reduce potential interference on the transmission medium by using at least a first and a second Hermite-Gaussian waveform component, so as to distinguish a first portion of data from a second portion of data. Since each Hermite-Gaussian waveform component has a substantially similar shape in the frequency and time domains, each waveform occupies a well-defined space. Hence, interference and cross talk are avoided even though a multiplicity of Hermite-Gaussian waveform components are simultaneously conveyed over the transmission medium.

Briefly stated, these and other objects of the invention are attained in the form of systems and methods for enhancing the effective data throughput of a communications link. Data throughput is enhanced by transforming an incoming bit stream into one or more Hermite-Gaussian packets that each include a plurality of Hermite-Gaussian waveform components. This transformation is accomplished by mapping incoming bits to a set of Hermite-Gaussian functions, such that respective Hermite-Gaussian functions in the set of functions are enabled and/or disabled over time. When a particular Hermite-Gaussian function is enabled, this causes generation of a corresponding Hermite-Gaussian waveform component whereas, at times when this function is disabled, the corresponding Hermite-Gaussian waveform component is not generated. A plurality of generated Hermite-Gaussian waveform components are combined to generate a Hermite-Gaussian packet. These Hermite-Gaussian packets are then combined into a Hermite-Gaussian information stream that is transmitted over the communications link.

Pursuant to a further embodiment of the invention, these incoming bits comprise a digital bit stream carried on one or more incoming channels in the form of binary "on" and "off" bits. These digital bits are converted into a plurality of individual Hermite-Gaussian waveform components which are combined to provide a Hermite-Gaussian information stream. The conversion process maps each of respective incoming digital bits to a corresponding one of a group of Hermite-Gaussian functions. This mapping process is implemented via a serial-to-parallel data conversion mechanism which illustratively utilizes a group of N Hermite-Gaussian functions, wherein a first incoming bit is mapped to a first Hermite-Gaussian function, a second incoming bit is mapped to a second Hermite-Gaussian function, and so on, until the Nth Hermite-Gaussian function is reached, whereupon the process cycles back to the first Hermite-Gaussian function (as used herein, N is a positive integer). Each Hermite-Gaussian function in the group of N functions is mutually orthogonal with respect to all other functions in the group.

If the incoming bit is a "1", "on", or "high" bit, this enables the corresponding Hermite-Gaussian function, whereas if the bit is a "0", "off", or "low" bit, this disables the corresponding Hermite-Gaussian function. When enabled, each respective Hermite-Gaussian function specifies the transmission of a corresponding predetermined Hermite-Gaussian waveform. Each predetermined waveform is characterized by a waveform shape that is substantially similar in the frequency and time domains. Moreover, each of respective predetermined waveforms possesses a corresponding set of frequency components and lasts for a corresponding length of time.

Illustratively, the predetermined waveforms could all specify substantially the same time duration, but this is not a requirement. A first predetermined waveform could be utilized that has a different time duration than a second predetermined waveform.

Illustratively, a set of Hermite-Gaussian waveforms could be selected which fit within a predesignated frequency range. In such a scenario, the time durations of the "interesting" (non-zero) parts of the functions will differ from function to function. However, the centers of the interesting parts of the functions can be made to substantially coincide in time for all functions in the set of Hermite-Gaussian waveforms, by delaying or accelerating specific Hermite-Gaussian functions as appropriate. In this manner, the orthogonality of all functions in the set of Hermite-Gaussian functions is maintained.

Pursuant to a further embodiment of the invention, individual Hermite-Gaussian waveform components are combined into a Hermite-Gaussian packet by summing a plurality of these individual Hermite-Gaussian waveform components. This sum could be weighted or unweighted with respect to the individual predetermined waveforms.

Pursuant to another alternate embodiment of the invention, one or more of these Hermite-Gaussian functions could be selectively "chirped", where chirping refers to slightly shifting the frequency or time domain properties of the function relative to the original unchirped function. This shifting should not be so pronounced that it causes a first Hermite-Gaussian function to closely resemble another, second Hermite-Gaussian function in the set of N functions. Selective chirping refers to the fact that, on some occasions, the original unchirped function is transmitted, whereas, on other occasions, the chirped version is transmitted. The decision of when to send out a chirped version of a function can be based on an encoding algorithm, so as to further increase data carrying capacity.

Regardless of whether or not the optional chirping feature is implemented, the use of Hermite-Gaussian waveform components permits the utilization of simple, elegant designs at the receiver end. Since Hermite-Gaussian functions occupy a confined area in the frequency domain, a frequency-selective filtering mechanism can be used to separate information carried by a first Hermite-Gaussian waveform component from information carried by other Hermite-Gaussian waveform components. This enables waveform components from each Hermite-Gaussian function to be separated from the composite stream of combined Hermite-Gaussian waveforms, and thence used to reconstruct a digital stream of information corresponding to the original incoming digital signal.

Accordingly, pursuant to another embodiment of the invention, receiving devices and methods are disclosed for receiving, detecting, and decoding an incoming Hermite-Gaussian composite information stream. Due to the fact that each Hermite-Gaussian waveform component of the composite information stream is limited and confined to a specific region in the time domain as well as the frequency domain, each such waveform component is rendered distinctive and non-interfering with respect to every other Hermite-Gaussian waveform component. Accordingly, these waveforms may be detected by a receiver based upon frequency domain characteristics, time domain characteristics, or both. This unique and heretofore unexploited property of time and frequency confinement is especially useful in, situations where it is desired to provide all or a portion of a communications link using a single transmission medium or channel.

One advantage of the foregoing processes, referred to hereinafter as Hermite-Gaussian Encoding (HGE) and Hermite-Gaussian Decoding (HGD), is that communication is not limited by time, nor is use of a specific transmission medium required. HGE can provide a greater number of distinct channels over electronically-based, optically-based, coaxially-based or electromagnetically-based transmission media relative to prior art multiplexing and compression systems. Using the additional effective bandwidth which HGE provides, higher bit sampling can be effected, thereby providing greater fidelity in transmission. The common practice of telephone companies is to use a digital coding processor that take 8,000 samples per second at 8 bits, for a total of 64,000 bps. HGE can operate in the context of these conventional telephone company sampling rates, which is adequate for intelligible reproduction of the human voice, and which also permits high-speed data communication approaching or surpassing that of state-of-the-art 56K modems. However, HGE could also be implemented in a manner so as to code for the bandwidth limits of the human ear, which approaches 20,000 Hz, or any other arbitrarily-defined bandwidth. Digitizing can be accomplished by taking 22,000+ samples, at 16 bits, 44,100 samples per second per channel, for a total of 2 times 700k+ bits per second. This can yield music of CD (compact disk) quality over an existing telephone or data line.

BRIEF DESCRIPTION OF THE DRAWINGS

For a better understanding of the invention, as well as other objects and features thereof, reference is made to the accompanying drawings wherein:

FIGS. 7A–7D, 8A–8D, and 9A–9D are waveform diagrams showing a number of different functions in the frequency and time domains, for purposes of illustrating the special properties of Hermite-Gaussian functions which include temporal, as well as frequency, confinement.

DETAILED DESCRIPTION OF THE PREFERRED EMBODIMENTS

The systems and methods of the present invention enhance the effective bandwidth capacity of communications links or storage media by transmitting a plurality of Hermite-Gaussian waveform components each characterized by a unique Hermite-Gaussian function. A combination of Hermite-Gaussian waveform components is used to construct a Hermite-Gaussian packet, and a plurality of Hermite-Gaussian packets is used to generate a Hermite-Gaussian stream.

Pursuant to a first embodiment of the invention that increases the effective data throughput of a transmission medium, incoming information is received as a bit stream of binary coded information ("0"s and "1"s), and then transformed to an equivalent coding in which "0"="no-play" and "1"="play", to be applied to generation and/or transmission and/or enablement of a Hermite-Gaussian waveform component selected from a set of predetermined Hermite-Gaussian waveform components.

Fundamentally, a Hermite-Gaussian function is any function that has the same shape (modulo a constant) in both the frequency domain and the time domain. The invention also encompasses the use of functions that, although they are not strict Hermite Gaussian functions, have a substantially similar shape in both the frequency and time domains and, hence, approach Hermite-Gaussian behavior. Hermite-Gaussian functions, as well as functions approaching Hermite-Gaussian behavior, have the advantageous property of being substantially confined in both of the aforementioned domains. Also, each Hermite-Gaussian waveform component in the set of predetermined Hermite-Gaussian waveform components is unique and mutually orthogonal with respect to all other Hermite-Gaussian waveform components in the set.

The outputs of the generated and/or transmitted and/or enabled Hermite-Gaussian waveform components are summed, after undergoing an optional weighting process, thereby providing a Hermite-Gaussian packet and, thence, a Hermite-Gaussian stream of packets. The optional weighting process modifies the amplitude and/or magnitude of a first Hermite-Gaussian waveform component relative to that of a second Hermite-Gaussian waveform component.

Methods and systems in accordance with the invention may be used in conjunction with any transmission medium capable of conveying or transmitting a stream of information. Such transmission media include wire, satellite transmission, wireless communications, radio frequency transmission over the air, radio frequency transmission through a coaxial cable, fiber optics, etc. and such protocols as T-1, ATM, Frame Relay, etc. Systems and methods developed in accordance with the invention will function with virtually any digital information capable of being transmitted or stored, such as data, image, video or voice applications.

Figure 1:
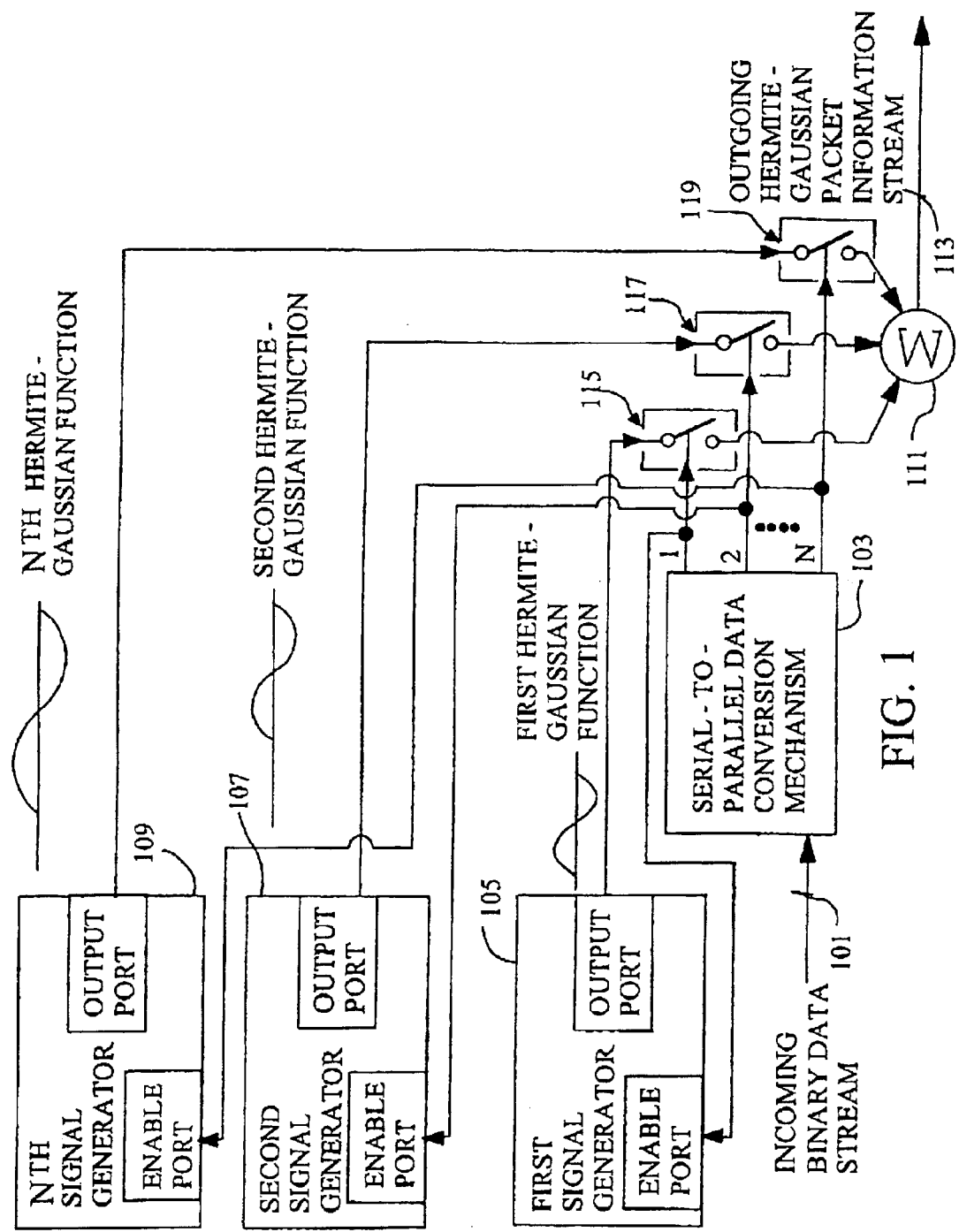
FIG. 1 is a hardware block diagram setting forth an illustrative hardware implementation of the present invention equipped to convert incoming binary data into a Hermite-Gaussian packet stream for transmission over a communications link.

FIG. 1 is a hardware block diagram setting forth an illustrative hardware implementation of the present invention equipped to convert incoming binary data into a Hermite-Gaussian stream for transmission over a communications link. An incoming binary data stream 101 includes a sequence of logical "1"'s and "0"'s. This data stream 101 may originate, for example, from a computing device such as a personal computer, server, or computer-readable data storage device, and/or from a telephonic or other communications device. Data stream 101 is inputted to a serial-to parallel data conversion mechanism 103 which converts a single incoming data stream (such as data stream 101) into a plurality of N data streams, where N is a positive integer greater than zero. Illustratively, this conversion process could map a first incoming bit to a first output line 1, a second incoming bit to a second output line 2, and so on, until the Nth incoming bit is routed to the Nth input line N, whereupon the process cycles back, such that the next incoming bit is routed to the first output line 1, and so on. Of course, a sequential routing of bits to each output line is not required, as any of a variety of known algorithms could be employed to convert a single incoming binary data stream 101 into multiple data streams on N output lines.

Each of the N output lines 1, 2, . . . N is routed to a corresponding switch 115, 117, 119, and controls the state of that switch. For example, output line 1 controls switch 115, output line 2 controls switch 117, and output line N controls switch 119. Although FIG. 1 shows a mechanical implementation of switches 115, 117, and 119, this is solely for illustrative purposes, as these switches could be implemented electronically, in firmware, in software, or in various combinations thereof.

A first pole of switch 115 is coupled to the output port of a first signal generation 105, a first pole of switch 117 is coupled to the output port of a second signal generator 107, and a first pole of switch 119 is coupled to the output port of an Nth signal generator 109. First signal generator 105 is adapted to generate a first Hermite-Gaussian waveform component. Second signal generator 107 is adapted to generate a second Hermite-Gaussian waveform component, and Nth signal generator 109 is adapted to generate an Nth Hermite-Gaussian waveform component. Each Hermite-Gaussian waveform component specifies the generation of a predetermined Hermite-Gaussian function that is inherently limited to a predetermined length of time and a predetermined bandwidth of frequencies. Illustrative Hermite-Gaussian functions will be described in much greater detail hereinafter.

First signal generator 105 has an "enable" port which is coupled to the first output line 1, directly, or optionally through an inverter stage. In this manner, the first signal generator 105 is not enabled until a logical "high" or "1" bit appears at the first output line 1, if an inverter stage is not used. This permits proper phase synchronization of the waveform generated by first signal generator 105. On the other hand, if an optional inverter stage is used, the first signal generator 105 is not enabled until a logical "low" or "0" bit appears at the first output line 1. In a similar manner, second signal generator 107 has an "enable" port which is coupled to the second output line 2, and Nth signal generator 109 has an "enable" port which is coupled to the Nth output line N.

A second pole of switch 115, a second pole of switch 117, and a second pole of switch 119 are each coupled to a respective input port of a summing device 111. When a particular switch, such as switch 115, is placed into a "closed" state, for example, by output line 1, this permits the output of first signal generator 105 to be applied to an input port of summing device 111. A "closed" state signifies completion of an electrical circuit between the first and second poles of a switch, whereas an "open" state signifies lack of a completed circuit path between the first and second poles of a switch. In practice, the "closed" state may provide a low-impedance and/or low-resistance circuit path between the first and second poles of a switch, whereas the "open" state may provide a high-impedance and/or high-resistance circuit path between these poles.

In an analagous manner, when switch 117 is placed into a "closed" state by output line 2, this permits the output of second signal generator 107 to be applied to an input port of summing device 111, and when switch 119 is placed into a "closed" state by output line N, this permits the output of Nth signal generator 109 to be applied to an input port of summing device. The output of summing device 111 is a waveform that includes contributions from one or more of the signal generators 105, 107, 109. At any particular moment in time, this waveform may include contributions from one, some, all, or none of these signal generators. When a particular switch, such as switch 115, is placed into an "open" state, for example, by output line 1, the output of first signal generator 105 will not be applied to an input port of summing device 111, and the output of summing device 111 will not include contributions from the first signal generator 105 substantially during the time that switch 115 is in the "open" state.

The switches 115, 117, 119 and enable ports of FIG. 1 may optionally be controlled so as to provide a Hermite-Gaussian packet wherein the midpoints of two or more of the individual waveform components making up the packet are substantially aligned in the time domain and/or the frequency domain.

The output of summing device 111 represents an outgoing Hermite-Gaussian information stream 113 constructed of a plurality of individual Hermite-Gaussian packets. Across a specific window of time, the output of summing device 111 could be conceptualized as a Hermite-Gaussian packet. This Hermite-Gaussian information stream 113 may be transmitted over any communications link, such as a wireless and/or RF (radio frequency) communications system, a wired connection, a fiber-optic network, a satellite system, and various combinations thereof. The contents of this outgoing Hermite-Gaussian composite information stream 113, representing an encoded version of incoming binary data stream 101, will be described in greater detail hereinafter.

Hermite-Gaussian Information Stream

Conceptually, a Hermite-Gaussian packet is constructed from a set of Hermite-Gaussian functions. These functions are utilized, potentially in a modified form, to encode a sequence of symbols as a continuous-time signal, and to decode this signal into the sequence of symbols that it represents. Encoding occurs by computing a weighted sum, also called a linear combination, of the Hermite-Gaussian functions. Alternatively, a non-weighted sum of the Hermite-Gaussian functions is computed. If weighting is employed, the weight for a given Hermite-Gaussian function given by the symbol corresponding to that function. Each Hermite-Gaussian function corresponds to a position in a sequence of symbols in a predetermined way, and may be identified by the position in the sequence to obtain a first, second, third, etc. Hermite-Gaussian function in a predetermined set of Hermite-Gaussian functions. These symbols may represent incoming digital data, and/or may be generated from this incoming data.

Use of any set of Hermite-Gaussian functions ensures there is no element in the set of functions that can be constructed using only a linear combination of the other elements. In other words, these functions are linearly independent, which is required for each sequence of symbols to yield a unique signal. This linear independence must be provided in order for the decomposition of the signal into constituent weighting factors and Hermite-Gaussian functions to yield a unique solution. This criterion also aids in constructing a predetermined set of Hermite-Gaussian functions that are very compact in amplitude. Using a predetermined set of Hermite-Gaussian functions is often preferred (although not strictly required), so as to enable design of appropriate signal generation circuitry.

Figure 2:
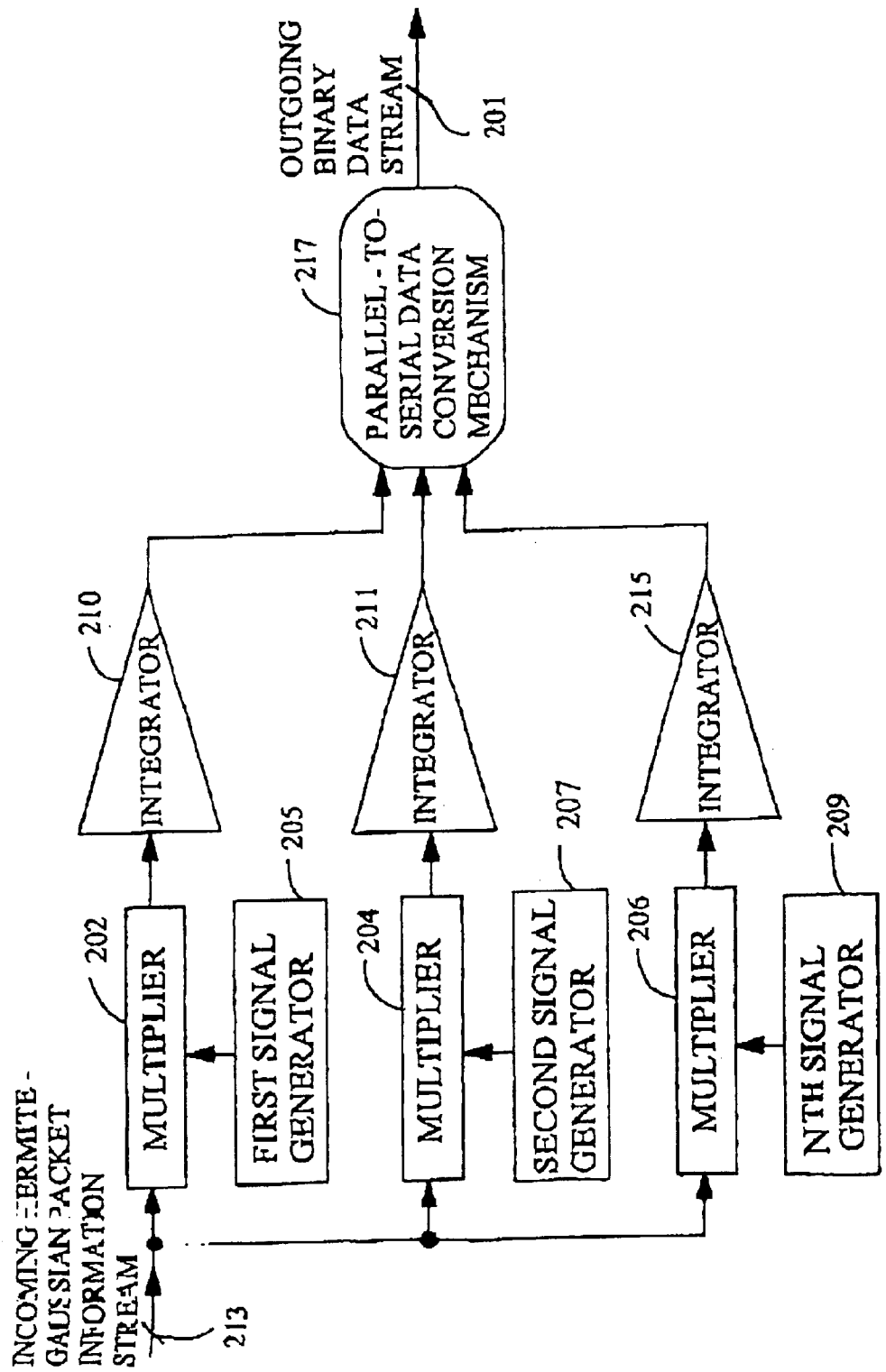
FIG. 2 is a hardware block diagram setting forth an illustrative hardware implementation of the present invention equipped to decode an incoming Hermite-Gaussian packet into one or more streams of binary data.
Figure 3A:
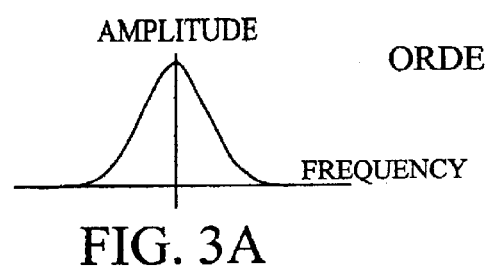
FIGS. 3A, 3C, 3E, 3G, and 3J are waveform diagrams setting forth several illustrative Hermite-Gaussian functions in the time domain.
Figure 3B:
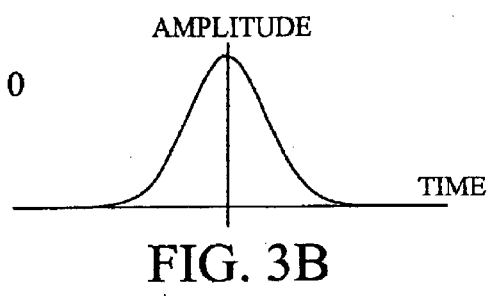
FIGS. 3B, 3D, 3F, 3H, and 3K are waveform diagrams setting forth corresponding representations of the aforementioned functions in the frequency domain.
Figure 3C:
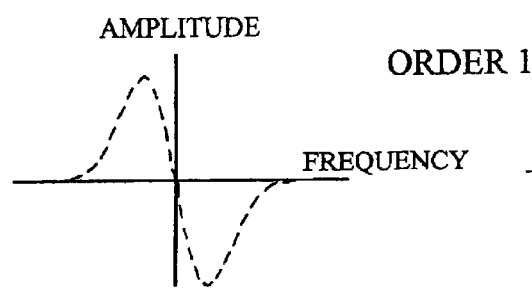
Figure 3D:
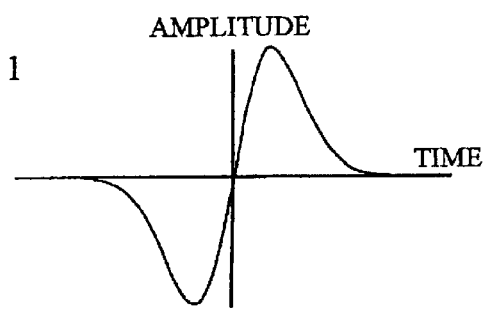
Figure 3E:
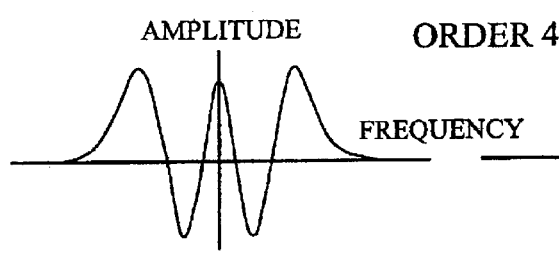
Figure 3F:
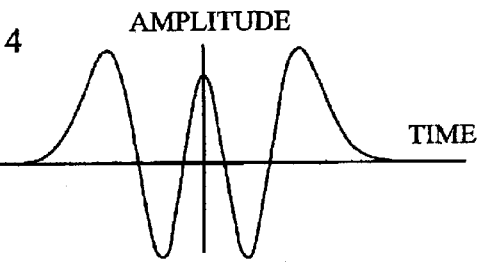
Figure 3G:
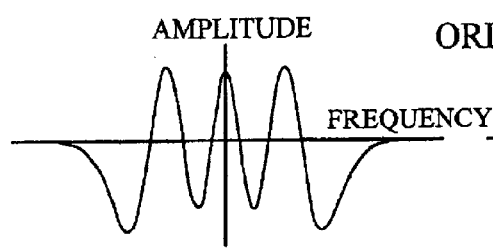
Figure 3H:
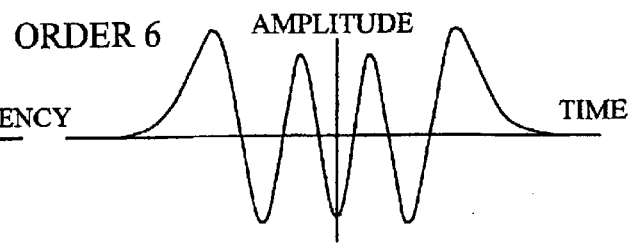
Figures 3J, 3K:
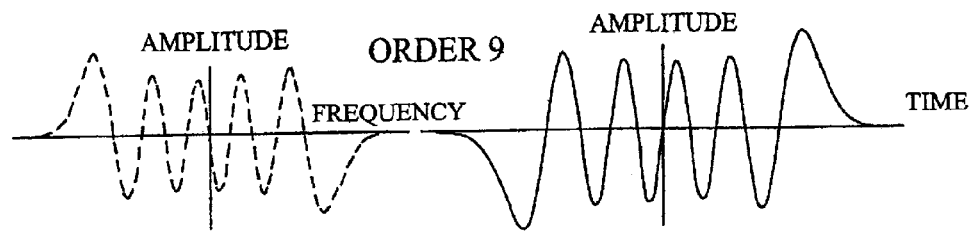

FIG. 2 is a hardware block diagram setting forth an illustrative hardware implementation of the present invention equipped to decode an incoming Hermite-Gaussian packet 213 into one or more streams of binary data (such as outgoing binary data stream 201). The incoming Hermite-Gaussian packet 213 is coupled to a first input port of at least one multiplier, such as multipliers 202, 204, 206. A second input port of at least one multiplier is coupled to a signal generator. In the example of FIG. 2, a second input port of a first multiplier 202 is coupled to a first signal generator 205, a second input port of a second multiplier 204 is coupled to a second signal generator 207, and a second input port of an Nth multiplier 206 is coupled to an Nth signal generator 209.

First, second and Nth signal generators 205, 207, and 209 are conceptually similar to first, second, and Nth signal generators (105, 107, 109) of FIG. 1. First signal generator 205 is adapted to generate a first Hermite-Gaussian waveform component. Second signal generator 207 is adapted to generate a second Hermite-Gaussian waveform component, and Nth signal generator 209 is adapted to generate an Nth Hermite-Gaussian waveform component. Each Hermite-Gaussian waveform component specifies the generation of a predetermined Hermite-Gaussian function that is inherently limited to a predetermined length of time and a predetermined bandwidth of frequencies. The output of first multiplier 202 is coupled to a first integrator 210. Likewise, the output of second multiplier 204 is coupled to a second integrator 211, and the output of Nth multiplier 206 is coupled to an Nth integrator 215. The first, second, and Nth integrators 210, 211, 215 may be implemented using any of various techniques which are within the knowledge of skilled artisans. These integrators (and, possibly, multipliers 202, 204, 206, and/or signal generators 205, 207, and 209), as well as any combination thereof, may be provided in the form of one or more general-purpose integrated circuits, ASICs (application specific integrated circuits), discrete elements, or the like.

N discrete integrators 210, 211, 215 are shown in the configuration of FIG. 2 for illustrative purposes, as a single integrator element could be shared among all N multipliers in some system applications. Or two or more multipliers could share a single integrator. In cases where an integrator is shared among more than one multiplier, an optional switching mechanism could be employed to selectively direct the output of a particular multiplier to the input of the integrator at a particular point in time. At a later point in time, the switching mechanism would then route the output of another multiplier to the input of this integrator. In this manner, the input of the integrator would be sequentially coupled to the output of each of a plurality of multipliers.

Returning to the illustrative embodiment shown in FIG. 2, the outputs of the integrators 210, 211, and 215 are fed to an optional parallel-to-serial data conversion mechanism 217 which converts a plurality of parallel streams of incoming information into a single outgoing binary data stream. Pursuant to an alternate embodiment of the invention, the outputs of each integrator 210, 211, 215 could each represent a separate, individual, independent stream of binary data which is not combined with streams from any other integrator. Moreover, in the embodiment described in the foregoing paragraph where a single integrator is shared among all multipliers, then the parallel-to-serial data conversion mechanism 217 is not required. In any event, outgoing binary data stream 201 may represent data in conventional binary form.

The hardware embodiments of FIGS. 1 and 2 may be employed to create multiple channels using frequency division multiplexing (FDM) where each of the channels consists of a stream of packets. Each of these packets, in turn, is constructed from weighted sums of a set of Hermite-Gaussian functions.

An illustrative Hermite-Gaussian stream 213 (FIG. 2) and 113 (FIG. 1) may be constructed using any of a number of different techniques. For example, a simple Hermite-Gaussian stream of packets may be constructed from a predetermined set of Hermite-Gaussian functions, an illustrative example of which is shown in FIGS. 3A–3K.

Refer now to FIGS. 3A, 3C, 3E, 3G, and 3J, which are waveform diagrams setting forth several illustrative Hermite-Gaussian functions in the time domain, and FIGS. 3B, 3D, 3F, 3H, and 3K, which are waveform diagrams setting forth corresponding representations of the aforementioned functions in the frequency domain. For example, the time domain diagram of FIG. 3A corresponds to the frequency-domain diagram of FIG. 3B; the time-domain diagram of FIG. 3C corresponds to the frequency-domain diagram of FIG. 3D, and so on. Respective time-domain diagrams (i.e., FIG. 3A) are related to corresponding frequency-domain diagrams (i.e., FIG. 3B) through the Fourier transform. The number of times that a function crosses the horizontal axis (i.e., the time or frequency axis) is the same as the "order" of the function. The time interval occupied by a Hermite-Gaussian function increases slowly with increasing orders, approximately as the square root of n, where n is the order. In the diagrams of FIGS. 3A–3K, and throughout the other diagrams as well, dashed or dotted lines indicate function values that are imaginary.

FIGS. 4A, 4B, 4C, and 4D are waveform diagrams that illustrate Hermite-Gaussian functions shifted in the frequency domain to obtain signals have nearly all frequency) their energy concentrated within a selected range of frequencies. Note how each respective function in the time domain (i.e., FIG. 4A) is the same as its corresponding function in the frequency domain (i.e., FIG. 4B), but modulated by a sine and cosine of a frequency equal to the shift in the frequency domain. As always, dashed or dotted lines indicate function values that are imaginary.

Figures 4A, 4B:
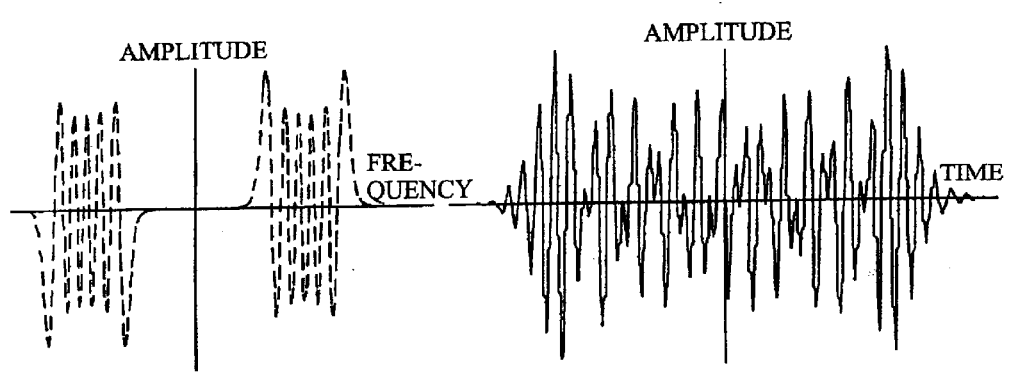
FIGS. 4A, 4B, 4C, and 4D are waveform diagrams that illustrate Hermite-Gaussian functions shifted in the frequency domain to obtain signals have nearly all frequency) their energy concentrated within a selected range of frequencies.
Figures 4C, 4D:
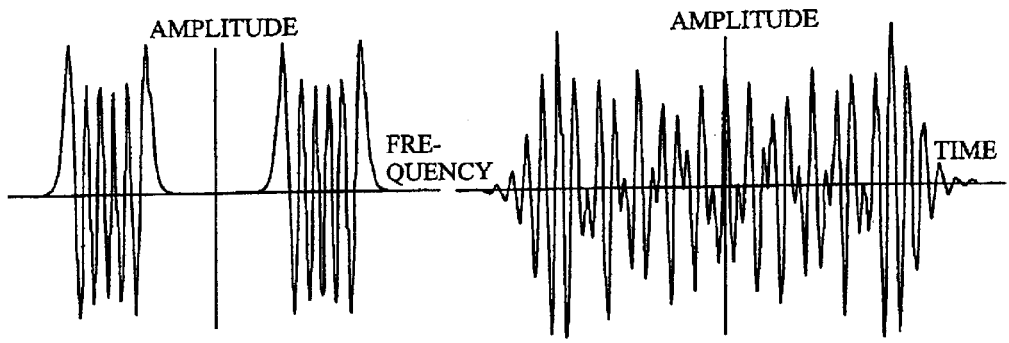
Figure 5A:
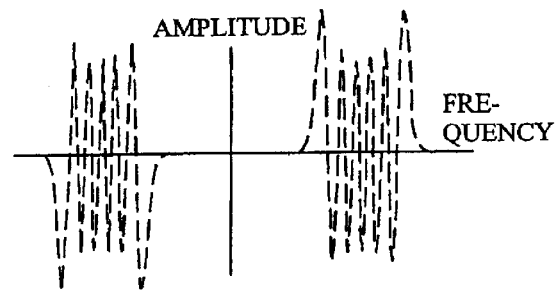
FIGS. 5A and 5C show the same waveform diagrams as were previously depicted in FIGS. 4A and 4C, respectively.
Figure 5B:
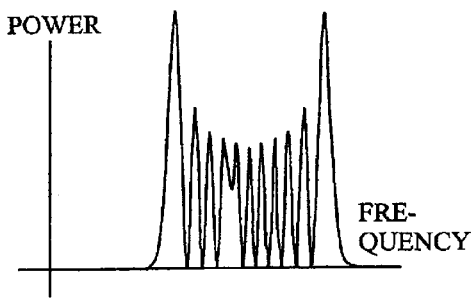
FIGS. 5B and 5D show the power spectra corresponding to the waveforms of FIGS. 5A and 5C on a linear scale.
Figure 5C:
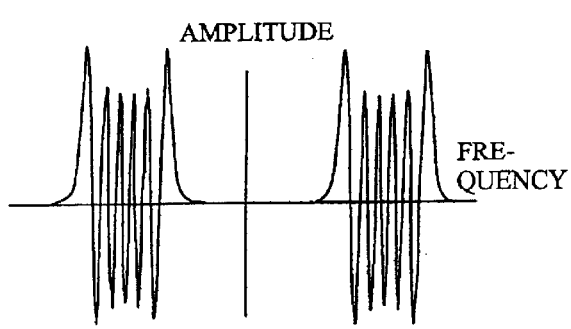
Figure 5D:
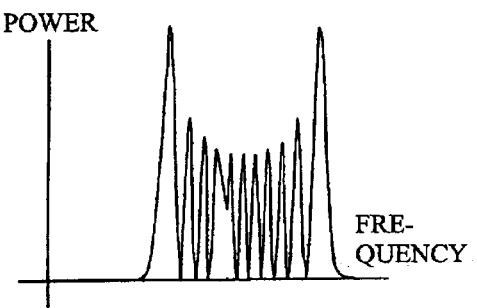

FIGS. 5A and 5C show the same waveform diagrams as were previously depicted in FIGS. 4A and 4C, respectively; and FIGS. 5B and 5D show the power spectra corresponding to the waveforms of FIGS. 5A and 5C on a linear scale. Observe that the power spectra of the two variants (FIGS. 5A and 5C) are identical.

Figure 6A:
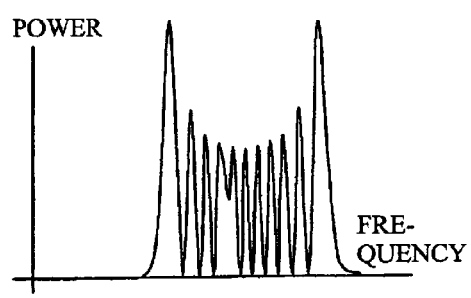
FIG. 6A shows the same power spectrum as was previously depicted in FIGS. 5B and 5D.
Figure 6B:
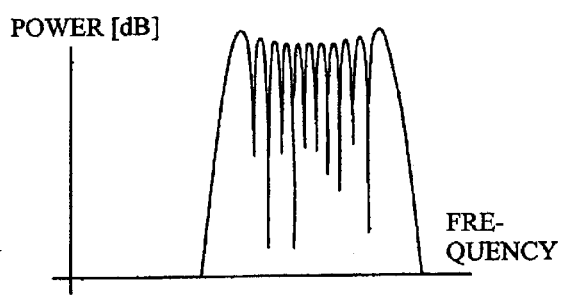
FIG. 6B shows the power spectrum of FIG. 6A plotted on a logarithmic (dB) scale.

FIG. 6A shows the same power spectrum as was previously depicted in FIGS. 5B and 5D; and FIG. 6B shows the power spectrum of FIG. 6A plotted on a logarithmic (dB) scale. The power spectrum is zero at ten frequencies and, at those frequencies, the logarithm is undefined. As the value at which a logarithm is taken approaches zero, the value of the logarithm approaches negative infinity. Therefore, the downward-pointing spikes shown in FIG. 6B are but rough approximations of the correct shape at those frequencies. In reality, these spikes point all the way down to negative infinity.

FIGS. 7A–7D, 8A–8D, and 9A–9D are waveform diagrams showing a number of different functions in the frequency and time domains, for purposes of illustrating the special properties of Hermite-Gaussian functions which include temporal, as well as frequency, confinement. For example, the sinc function of FIG. 7A is nicely confined to a rectangular slice in the frequency domain, but it spills into plus and minus infinity in the time domain (FIG. 7B). Similarly, a sinc function that is confined to a rectangular slice in the time domain (FIG. 7D) spills into plus and minus infinity in the frequency domain (FIG. 7C).

Figures 9A, 9B:
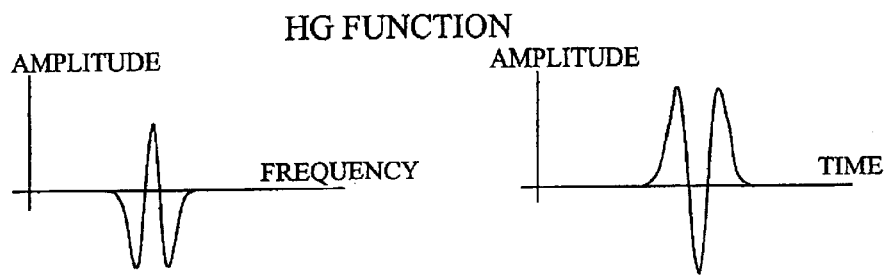
Figures 9C, 9D:
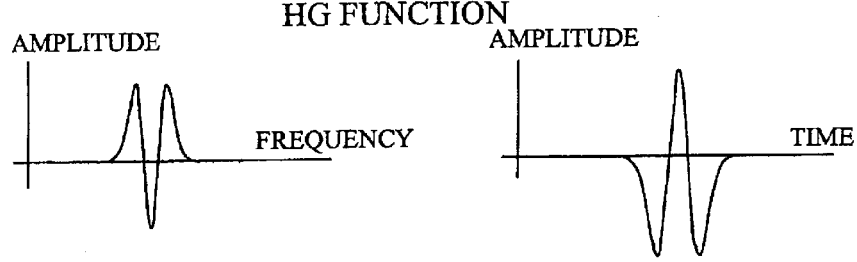

In order to reduce the dramatic spillover of the sinc functions shown in FIGS. 7B and 7C, the steep rise and fall in amplitude of the rectangular slice (FIGS. 7A and 7D) can be changed to a more gradual rise and fall in amplitude by using a raised-cosine function (FIGS. 8A–8D). However, even the more gradual raised-cosine functions of FIGS. 8A and 8D result in substantial spilling over, as is seen in FIGS. 8B and 8C. The best solution to this "spillover" problem is to use Hermite-Gaussian functions, examples of which are shown in FIGS. 9A–9D. Note that all of the functions in FIGS. 9A9D are concentrated within, and confined to, a limited region in both the frequency and time domains. While examining FIGS. 7A–7D, 8A–8D, and 9A–9D, it is apparent that Hermite-Gaussian functions represent a special compromise between concentration in frequency and concentration in time.

Figure 10:
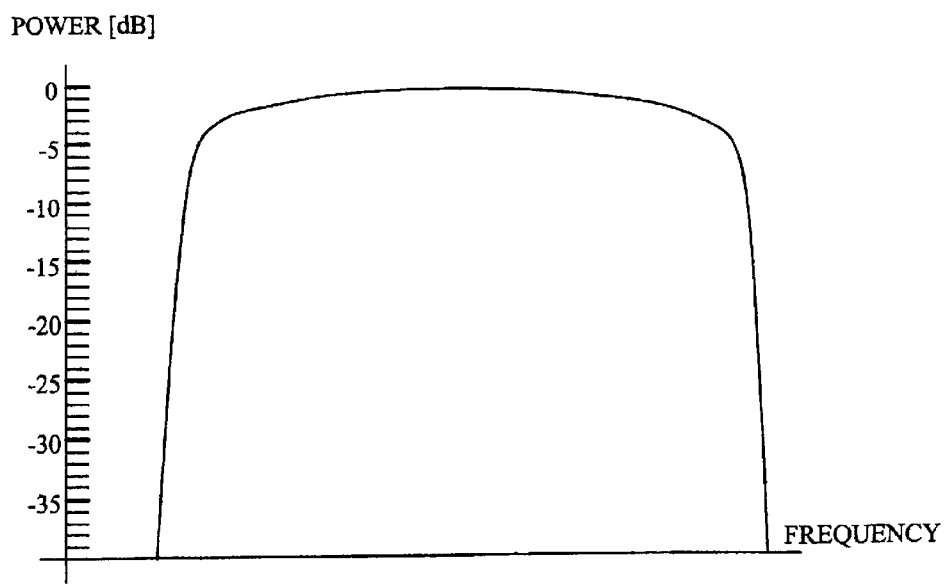
FIG. 10 is a graph showing the power spectrum (power in dB versus for a packet constructed as a weighted sum of Hermite-Gaussian functions.
Figure 11A:
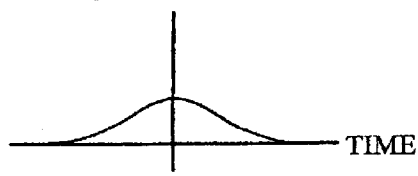
FIGS. 11A–11H and 11J–11K are waveform diagrams depicting a method of constructing a Hermite-Gaussian packet from an incoming sequence of bits {1, 1, 0, 1, 1, 1, 0, 0, 1, 1}.
Figure 11B:
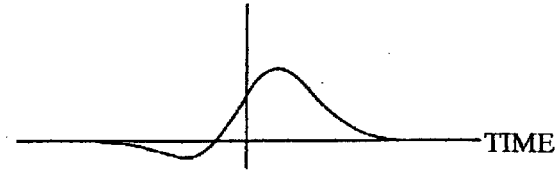
Figure 11C:
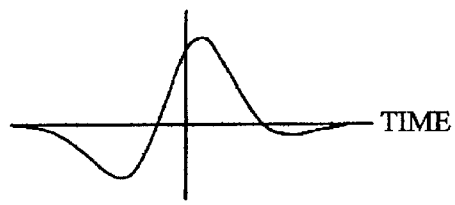
Figure 11D:
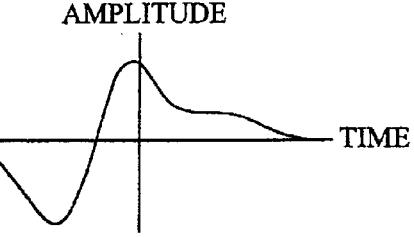
Figure 11E:
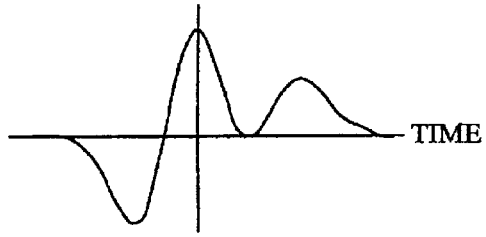
Figure 11F:
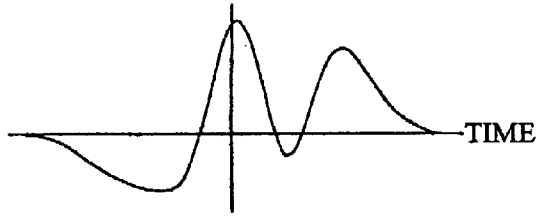
Figure 11G:
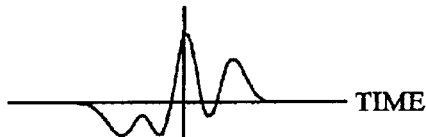
Figure 11H:
Figure 11J:
Figure 11K:

FIG. 10 is a graph showing the power spectrum (power in dB versus for a packet constructed as a weighted sum of Hermite-Gaussian functions. The weighting factor used to encode a zero bit is $^{-1}$, and the weighting factor used to encode a one bit is $^{1}$. Observe that the power spectrum is heavily concentrated within a very well-defined region in the frequency domain.

FIGS. 11A–11H and 11J–11K are waveform diagrams depicting a method of constructing a Hermite-Gaussian packet from an incoming sequence of bits (or symbols) as follows: {1, 1, 0, 1, 1, 1, 0, 0, 1, 1}. The process constructs a packet by starting with an encoded first symbol, then adding the second symbol to the first symbol, adding the result of this addition to the third symbol, and so on, until all symbols in the sequence or frame have been added. The symbol (or, in this case) bit sequence is encoded by using a weighting factor of −1 to encode a zero, and a weighting factor of 1 to encode a 1, yielding the following set of weighting factors: {1, 1, −1, 1, 1, 1, −1, −1, 1, 1}. The functions used are the first ten orders of the Hermite-Gaussian functions such as those shown in FIGS. 3A–3H and 3J–3K.

Transmission Line

The effect of a transmission line on a signal is three-fold: it disperses the signal in frequency and time, it attenuates the signal and it delays it—but these three are not independent. The delay is not problematic, as it is independent of the actual signal. The other two together are dependent on the frequency and on the distance, and worsen with increasing frequency and distance. Therefore a low-frequency signal can travel a longer distance than a high-frequency signal before becoming undetectable. The shape of a lower-frequency signal will also resemble the transmitted signal more closely than in the case of a higher-frequency signal.

Fortunately, transmission lines can be modeled, allowing one to determine the effect of a transmission line on a particular signal without actually transmitting it. Traditionally this could only be done for a periodic signal, but we now have a method that allows one to determine the effect of the line on a non-periodic or transient signal. With this method, not only can we predict the extent of the distortion, but we can compute what a particular signal will look like at the receiver, and thus correct for the transmission line.

The method employs a linear equation in the sense that the result of applying the equation to the sum of two signals is the same as applying it to both signals independently and then adding the results; and that scaling the input by a constant is equivalent to first computing the result for the unsealed input, and then multiplying by the constant. With these properties, the effect of the transmission line need only be computed once for each of the Hermite-Gaussian functions: the received signal corresponding to a particular Hermite-Gaussian packet is then given by a weighted sum (with the same weighting factors) of the functions after travelling the transmission line.

Utilizing this knowledge means using two different sets of Hermite-Gaussian functions: one for the transmitter, and one for the receiver. One of them can be fixed, the other needs to be adapted to the particular electrical properties of the transmission line, for example resistance and capacitance, and to the distance between the transmitter and the receiver. This can automated, and needs to be done only once for a particular situation.

In the straightforward set-up, one would use the original Hermite-Gaussian functions to construct the signal at the transmitter, and use the set of "transmitted" Hermite-Gaussian functions at the receiver. (In fact, this can be done by experimentation: send each of the Hermite-Gaussian functions and measure what the signal looks like at the receiver, and then use those.)

However, by far the hardest part is the reconstruction of the symbol sequence from the received signal, and it simplifies matters considerably if the Hermite-Gaussian functions needed for decoding the signal are optimized for that purpose. This requires them to be known in advance, and therefore, it is the transmitter that should adapt to the transmission line, and generate signals that have a known shape after travelling the line. This, too, is possible with our method because the transmission line equation is invertible.

The same procedure can be used to obtain the signals that, when transmitted, become the Hermite-Gaussian functions. This can be done either by computing weighted sums of the functions shown above, or by computing it from the Hermite-Gaussian functions directly. The result is the same. Using the foregoing method, one can easily compute what the Hermite-Gaussian packet for the sequence at the beginning of the document looks like at the transmitter.

This invention can be used to increase bandwidth capacity on existing transmission media and/or in conjunction with satellite transmission protocols. This invention has the following advantages:

(a) No other communications method uses Hermite-Gaussian functions to render channels unique. Its multiplexing function can be applied to a single channel, and/or a to channel that has already been separated into different channels by a multiplexer.

(b) It can be used on a single T-1 channel, a fractional T-1, or a T-1.

(c) It can be applied to any digital transmission protocol.

(d) It can be applied to any medium capable of carrying electronically-coded digital information.

(e) It can carry a large number of unique voice and data channels on a single line.

(f) It does not render channels unique by using time division, for such division has severe limitations.

(g) It does not rely on compression to increase bandwidth, and it is not subject to the limitation of using algorithms.

(h) it provides an inexpensive means of increasing bandwidth.

While various preferred embodiments of Hermite-Gaussian encoding and decoding techniques have been disclosed herein, it is to be understood that many changes may be made therein without departing from the spirit of the invention.

Thus, the aforementioned techniques can be applied not only to the communication of digital information, but also to its storage in which one or more digital information streams are stored in a CD ROM or other storage medium.

We claim:

1. A system for effectively increasing transmission throughput by transmitting Hermite-Gaussian packets over a transmission medium, the system comprising:

a receiving mechanism for receiving an incoming stream of digital information on one or more incoming lines, the digital information being in a binary format of "0"s and "1"s, and using the digital information to provide a stream of "no-play" and "play" commands;

a signal generation mechanism equipped to generate a plurality of Hermite-Gaussian waveform components;

a switching mechanism, coupled to the signal generation mechanism, for applying "no-play" and "play" commands to at least one Hermite-Gaussian waveform component of a set of Hermite-Gaussian wavefrom components, wherein the at least one Hermite-Gaussian waveform component is generated by the signal generation mechanism, such that a plurality of Hermite-Gaussian waveform components generates a Hermite-Gaussian packet, and a plurality of Hermite-Gaussian packets comprises a Hermite-Gaussian information stream; and a transmission mechanism for transmitting the plurality of Hermite-Gaussian packets over the transmission medium.

2. The system of claim 1 further comprising an information stream receiving mechanism for receiving an incoming information stream in the form of Hermite-Gaussian packets transmitted on the transmission medium; the information stream receiving mechanism including a multiplication mechanism coupled to a signal generation mechanism and an integration mechanism;

wherein the multiplication mechanism multiplies the incoming information stream by a signal generated by the signal generation mechanism, and the integration mechanism integrates the multiplied incoming information to generate one or more outgoing binary data streams.

3. The system of claim 2 wherein at least two of:

the multiplication mechanism, the signal generation mechanism, and the integration mechanism, are integrated into the software programming of a digital signal processor (DSP), computing mechanism, telecommunications switching device, and/or computer server.

4. The system of claim 1 wherein at least two of:

the multiplication mechanism, the signal generation mechanism, and the integration mechanism, are implemented by one or more application-specific integrated circuit chips (ASICs).

5. The system of claim 1, wherein the transmission medium utilizes any of twisted wire pairs, coaxial cable, optical cable, a satellite link, and a wireless link.

6. The system of claim 1, wherein the incoming stream of digital information represents any of video, images, data and voice.

7. A method for effectively increasing transmission throughput by transmitting Hermite-Gaussian packets over a transmission medium, the method comprising the steps of:

(a) receiving an incoming stream of digital information in a binary format of "0"s and "1"s, (b) using the digital information to provide a sequence of "no-play" and "play" commands;

(c) generating a Hermite-Gaussian waveform component from a set of Hermite-Gaussian waveform a components in response to a "play" command, such that, by applying "no-play" and "play" commands to the generating of the Hermite-Gaussian waveform components, at least one Hermite-Gaussian packet is generated; and (d) transmitting the at least one Hermite-Gaussian packet over the transmission medium.

8. The method of claim 7 further comprising the steps of receiving an incoming information stream in the form of at least one Hermite-Gaussian packet transmitted on the transmission medium; multiplying the incoming information stream by one or more Hermite-Gaussian waveform components, and integrating the multiplied information to generate one or more outgoing binary data streams.

9. The method of claim 8 wherein the steps of multiplying and integrating are combined into the software programming of a digital signal processor (DSP), computing mechanism, telecommunications switching device, and/or computer server.

10. The method of claim 8 wherein the steps of multiplying and integrating are implemented by one or more application-specific integrated circuit chips (ASICs).

11. The method of claim 7, wherein the transmission medium utilizes any of twisted wire pairs, coaxial cable, optical cable, a satellite link, and a wireless link.

12. The method of claim 7, wherein the incoming information stream represents any of video, images, data and voice.

* * * * *